C. W. ABBOTT.
CONDUCTOR FOR SYSTEMS OF ELECTRICAL DISTRIBUTION.
APPLICATION FILED FEB. 21, 1916.
1,208,884.
Patented Dec. 19, 1916.
3 SHEETS—SHEET 1.
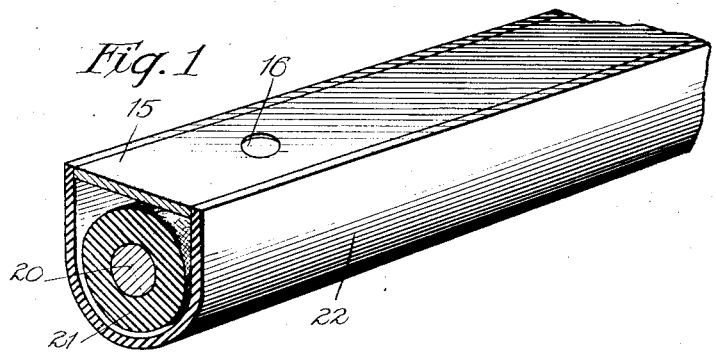
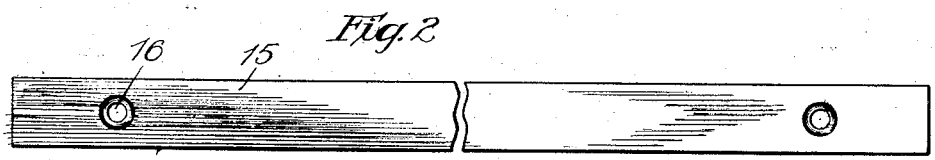
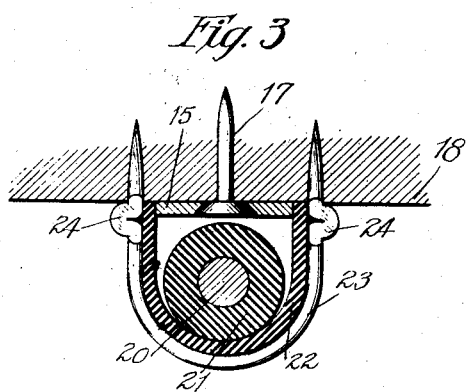
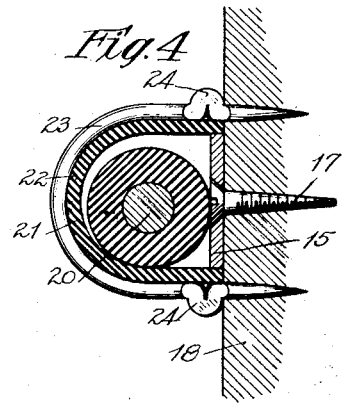
Witnesses:
Robert P. Bracke
Albin C. Ahlberg
Inventor
Chauncey W. Abbott
By Williams & Bradbury
Attorneys

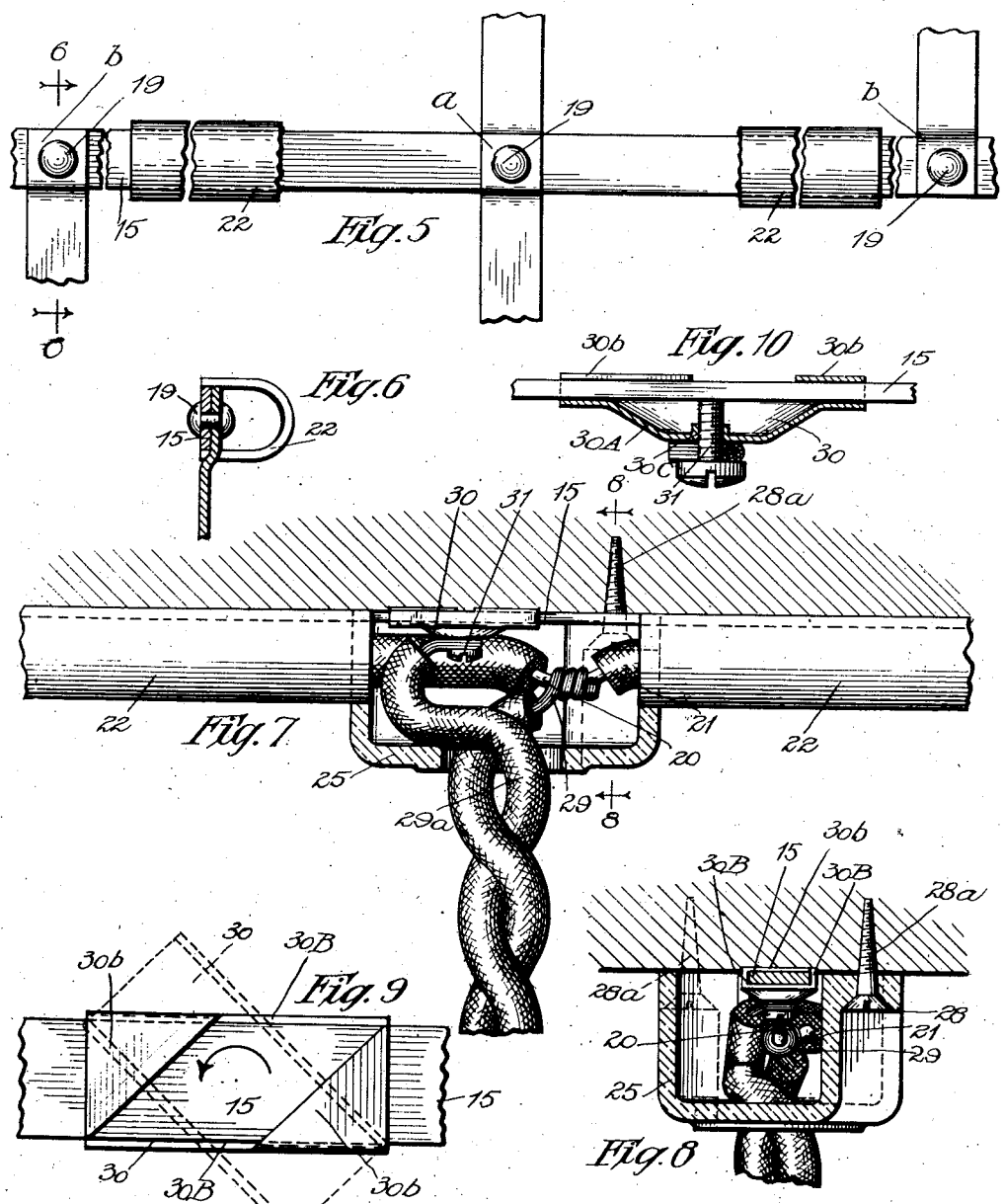

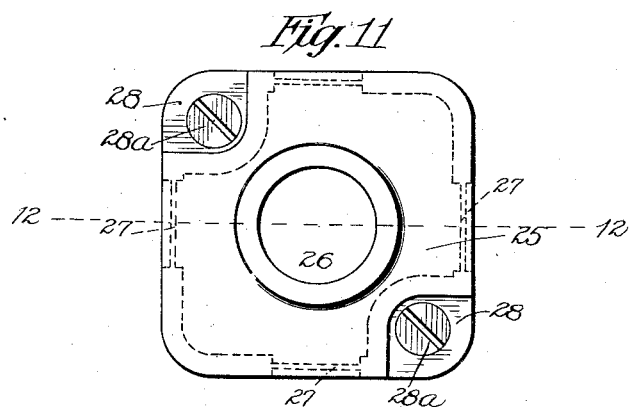
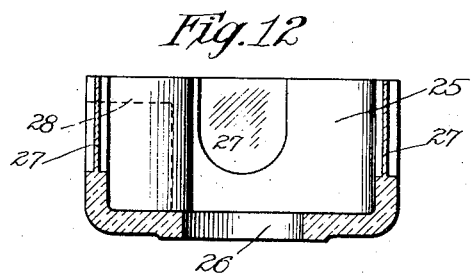

UNITED STATES PATENT OFFICE.

CHAUNCEY W. ABBOTT, OF PITTSBURGH, PENNSYLVANIA, ASSIGNOR TO AMERICAN CONDUIT MANUFACTURING COMPANY, OF PITTSBURGH, PENNSYLVANIA, A CORPORATION OF PENNSYLVANIA.

CONDUCTOR FOR SYSTEMS OF ELECTRICAL DISTRIBUTION.

1,208,884.

Specification of Letters Patent.  Patented Dec. 19, 1916.

Application filed February 21, 1916. Serial No. 79,588.

*To all whom it may concern:*

Be it known that I, CHAUNCEY W. ABBOTT, a citizen of the United States, residing at Pittsburgh, in the county of Allegheny and State of Pennsylvania, have invented certain new and useful Improvements in Conductors for Systems of Electrical Distribution, of which the following is a full, clear, concise, and exact description, reference being had to the accompanying drawings, forming a part of this specification.

My invention relates to conductors and the arrangement thereof in a system of electrical distribution, and primarily has to do with a system wherein one side of an electric circuit is constantly earthed, or grounded, and is not insulated.

My present invention, as will more fully hereinafter appear, provides a novel arrangement and combination of conductors, housings, etc., in a system the several component parts of which may be economically manufactured, readily handled and transported, and easily installed.

Briefly, in attaining the objects of my invention, I provide a flat metallic ribbon arranged to be secured to and to extend along walls, ceilings, or other flat supporting surfaces, and arranged to constitute the grounded side of an electric circuit. The said ribbon being perfectly flat may readily be coiled and thus marketed in continuous lengths the footage of which is governed only by the weights in which the coils of conducting ribbon can easily be handled. A suitably insulated wire conductor is extended along the flat grounded ribbon after the latter has been secured in position, the said insulated wire serving as the insulated or ungrounded side of the circuit of which the ribbon constitutes the grounded side. The insulated wire conductor being in all respects independent of the ribbon until installation may also readily be coiled and shipped in any desired lengths. Extending over and along the ribbon and insulated conductor is a cover member of general U or channel shape in cross section and conveniently of fiber, or other suitable insulating material, the legs of said cover embracing the edges of the ribbon and abutting against the surface over which the ribbon extends and to which it is secured. The channel-like cover members are conveniently marketed in lengths of, say, ten feet and are secured in position by staples, or other suitable retaining devices.

The advantages of the arrangement briefly outlined above, as well as the construction and functions of its several parts, will be explained in detail in the following description wherein reference is made to the accompanying drawings in which, Figure 1 is a perspective view showing the conducting ribbon, insulated wire conductor, and cover member in assembled position, but unassociated with a wall or other support. Fig. 2 is an isolated view of the conducting ribbon. Figs. 3 and 4 are cross sectional views illustrating how the several parts shown in Figs. 1 and 2 are secured in position upon a ceiling, wall, or other supporting surface. Fig. 5 illustrates the arrangement of the ribbons when branch or cross connections are to be made. Fig. 6 is a cross sectional view taken on the line 6—6 of Fig. 5 and looking in the direction indicated by the arrows. Fig. 7, in a view partly in elevation and partly in vertical section, illustrates a preferred arrangement to be employed when drops, or cord extensions, are used. Fig. 8 is a sectional view taken on the line 8—8 of Fig. 7 and looking in the direction indicated by the arrows. Fig. 9 is a plan view of a clip desirably used in connection with the conductor ribbon when connections of the type illustrated in Figs. 7 and 8 are employed. Fig. 10 is a sectional view of the clip illustrating how the same is retained upon the conductor ribbon with which it is associated. Fig. 11 is a bottom plan view of the fitting, or drop box illustrated in section in Figs. 7 and 8; and Fig. 12 is a cross sectional view taken on the line 12—12 of Fig. 11.

Similar characters of reference refer to similar parts throughout the several views.

Referring first to Figs. 1 to 4 inclusive: At 15 I have illustrated a thin narrow ribbon of electricity conducting material, preferably brass, the said narrow metallic ribbon being perfectly flat and, therefore, readily coiled. The ribbon 15 is provided at proper intervals with pierced holes 16 having counter-sunk edges, as most clearly shown in Figs. 2, 3, and 4, through which nails, brads, or screws, 17 may be driven firmly to secure the ribbon to a ceiling, wall, or other supporting surface indicated at 18. In installing the system of my invention the conducting ribbon 15 is led over and secured to the several walls, ceilings, etc., over which the conductors are designed to extend and in cases of branch or cross connections the intersecting ribbons are passed one over the other and preferably secured by rivets, as illustrated at 19—19 in Figs. 5 and 6. Inasmuch as the ribbons 15 constitute the grounded, or return, sides of the circuits of which they form a part it is convenient and desirable to cross and connect the intersecting ribbons as just described, the slight distance which the outer ribbon is spaced from the supporting surface at the intersection, due to the thin character of the ribbon, being in nowise a disadvantage and, in fact, an advantage where drop boxes and clips are used, as will be hereinafter explained, due to the fact that the slight clearance between the outer ribbon and the supporting surface facilitates the positioning and securing of the clip. At 20 I have illustrated a wire conductor mechanically unconnected with the conductor ribbon 15, but extending along that surface of the ribbon not in engagement with the supporting surface to which the ribbon is secured. The conductor 20 is provided with a suitable insulating sheath 21 and constitutes the insulated or ungrounded side of the circuit of which the ribbon 15 constitutes the grounded side. At 22 is shown a member of general U or channel shape in cross section extending over and along the ribbon 15 and insulated conductor 20, the legs of the member 22 embracing the edges of the ribbon 15 and abutting against the supporting surface by which the ribbon is carried, as is most clearly illustrated in Figs. 3 and 4. The U or channel shaped member 22 is conveniently of insulating material as, for instance, fiber and is retained in position by staples 23, or other suitable retaining devices. In case staples are employed for the purpose of securing the channels 22 in position the legs of the staples are desirably provided with portions 24 of enlarged cross section in order that the staples may not be driven into the supporting surfaces so far as to crush the channel. Staples of the type shown in Figs. 3 and 4 are particularly desirable when the channel, or cover member, is of such a material as fiber and thus liable to be broken or crushed if the staples be driven too far into the support. Attention is directed to the fact that the ribbon 15 and the channel member 22 associated therewith coöperate to afford a continuous passage free from obstructions through which the insulated wire conductor 20 passes, and, moreover, that the channel member, or cover, 22, due to the fact that its legs abut against the ceiling, wall, or other supporting surface, coöperates with said supporting surface to afford a housing for both the conducting ribbon and the insulated wire conductor 20. I might well point out at this point that the arrangement herein described is advantageous in that the channel member 22 can be finished in any suitable manner to match general or special wall finishes.

Referring now to Figs. 7 and 8, it will be seen that I have there illustrated an arrangement which may be employed when it is desirable to connect drop cords or cord extensions in the circuit comprising the conductor ribbon 15 and the insulated wire conductor 20. The drop or junction box indicated by the reference character 25 is preferably of the construction illustrated in detail in Figs. 11 and 12. The box is constructed of porcelain, or other suitable insulating material, and is provided with one open end which, when the box is positioned as shown in Figs. 7 and 8, is located adjacent the wall, ceiling, or other supporting surface, by which the box and its associated parts are supported. Formed in that end of the box opposite the open end thereof is an opening 26 through which drop or branch conductors are designed to be passed. It will be noted that the four sides of the box 25 are provided with thin integral webs, or knock-outs, 27 and that diagonal corners of the box are provided with shoulders 28 through which screws 28[a] or other suitable instrumentalities, may be passed to retain the box in operative position. It will be understood that in case the box 24 is to be used merely at a junction and is not to have flexible drops led therefrom, as shown in Fig. 7, the opening 26 may be dispensed with. When the box 25 is used as shown in Fig. 7 opposite webs, or knock-outs, 27 are removed to render the box capable of receiving the ends of the cover members 22. It will be understood, of course, that where cross connections of the type indicated at $a$ in Fig. 5 are made all of the webs, or knock-outs, 27 will be removed and that when connections of the type shown at $b$ in Fig. 5 are made but three of the porcelain webs, or knock-outs, will be removed.

Returning now to the specific arrangement illustrated in Fig. 7 it will be seen that the conductor 20 has a portion of its insulating sheath 21 removed and that the bared end of a drop conductor 29 is twisted around the bared portion of the wire 20. It will be understood that the connected portions of the conductors 20 and 29 may if desired be provided with tape or other suitable insulation, but for the purpose of clearness this insulation has been omitted in the drawing.

Fixed upon that portion of the ribbon 15 extending through the box 25 is a clip 30 stamped from thin sheet metal comprising the dished lower portion 30$^A$, the side walls 30$^B$ arranged to lie on either side of the conductor ribbon 15 and the ears 30$^b$, each of which is generally triangular in shape, is formed integral with one of the side walls 30$^B$, and is arranged to lie between the conductor ribbon 15 and the supporting surface by which the conductor ribbon is carried. In order to position the clip 30 upon the conductor ribbon 15 the clip is placed in the position indicated by dotted lines in Fig. 9 and is then turned in the direction indicated by the arrow in order to slip the triangularly shaped ears 30$^b$ in between the ribbon 15 and the surface on which the ribbon 15 is supported. The dished portion 30$^A$ of the clip 30 is conveniently provided with a hollow internally threaded central boss 30$^c$ into which is threaded a screw 31. It will be noted that the turning of the screw 31 in order securely to clamp the clip 30 upon the conductor ribbon 15 does not tend to dislodge the ears 30$^b$ for the reason that turning the screw 31 in clockwise direction tends to move the clip in the direction indicated by the arrow in Fig. 9. The screw 31 not only serves securely to retain the clip 30 in position upon the conductor ribbon 15, but also serves as a terminal whereby the bared end of the second drop conductor 29$^a$ may be connected with the ribbon 15.

From the foregoing description it will be understood that it is not necessary to interrupt the ribbon conductor where cross connections or drop connections are to be made or where such fittings as receptacles, switches, and the like are to be connected in circuit and that where lateral taps are made direct contact between the principal run of the ribbon conductor and the lateral run of the ribbon conductor can be made without interposing jumper plates, wires, or like means of junction.

Having thus described my invention what I claim as new and desire to secure by Letters Patent of the United States is:

1. In a system of the class described the combination with a flat ribbon of electricity conducting material extending over a supporting surface, a wire conductor separate from said ribbon and provided with an insulating sheath, said insulated wire conductor extending along that face of the ribbon not in engagement with the supporting surface, said ribbon and insulated wire conductor constituting electric circuit current carrying elements, and a cover member of general U shape in cross section extending over and along said insulated wire and ribbon with the legs of the cover embracing the edges of the ribbon whereby the ribbon and cover together provide a closed passage through which the insulated wire conductor extends.

2. In a system of the class described the combination with a flat continuous ribbon of electricity conducting material secured to and extending along a supporting surface, said conducting ribbon constituting one side of an electric circuit, an insulated wire conductor extending along that face of the ribbon opposite the supporting surface, said insulated wire conductor constituting the other side of the circuit aforesaid, together with a cover member of general U shape in cross section extending over and along said ribbon and insulated wire conductor and with the supporting surface constituting a housing for the ribbon and insulated wire conductor.

3. In a system of the class described the combination with a flat uninsulated ribbon of electricity conducting material extending over and secured to a supporting surface, said ribbon constituting the grounded conductor of an electric circuit, a wire having an insulating sheath extending along that face of the ribbon not in engagement with the supporting surface, said wire constituting the non-grounded conductor of the circuit aforesaid, and a cover member secured to the supporting surface and extending over and along said ribbon and insulated wire conductor.

4. In a system of the class described the combination with a metallic ribbon adapted to extend along and to be secured to a wall, or other flat supporting surface, said metallic ribbon constituting a part of one side of an electric circuit, a wire conductor disposed adjacent that face of the ribbon opposite the supporting surface and extending along opposite said ribbon, an insulating sheath for said wire conductor, said wire conductor constituting a part of the other side of the circuit aforesaid, together with a channel like cover member extending over and along said ribbon and insulated wire conductor and with the supporting surface constituting a housing for said ribbon and insulated wire conductor.

5. In a system of electrical distribution the combination with a flat flexible ribbon of electricity conducting material extending over a supporting surface, a cover member of general U shape in cross section extending over and along said ribbon with the legs of the cover embracing the edges of the ribbon whereby the cover and ribbon provide a continuous passage without obstructions therein, and a conductor extending through said passage and insulated from the electricity conducting ribbon aforesaid.

In witness whereof, I hereunto subscribe my name this 11th day of February, A. D. 1916.

CHAUNCEY W. ABBOTT.

Witnesses:
W. H. STONE,
D. H. MURPHY.